Jan. 5, 1954

A. E. FEINBERG 2,665,395

MEASURING CIRCUIT

Filed Nov. 18, 1950

Inventor
Albert E. Feinberg
By I. Irving Silverman
Attorney

Jan. 5, 1954
A. E. FEINBERG
2,665,395
MEASURING CIRCUIT
Filed Nov. 18, 1950
2 Sheets-Sheet 2
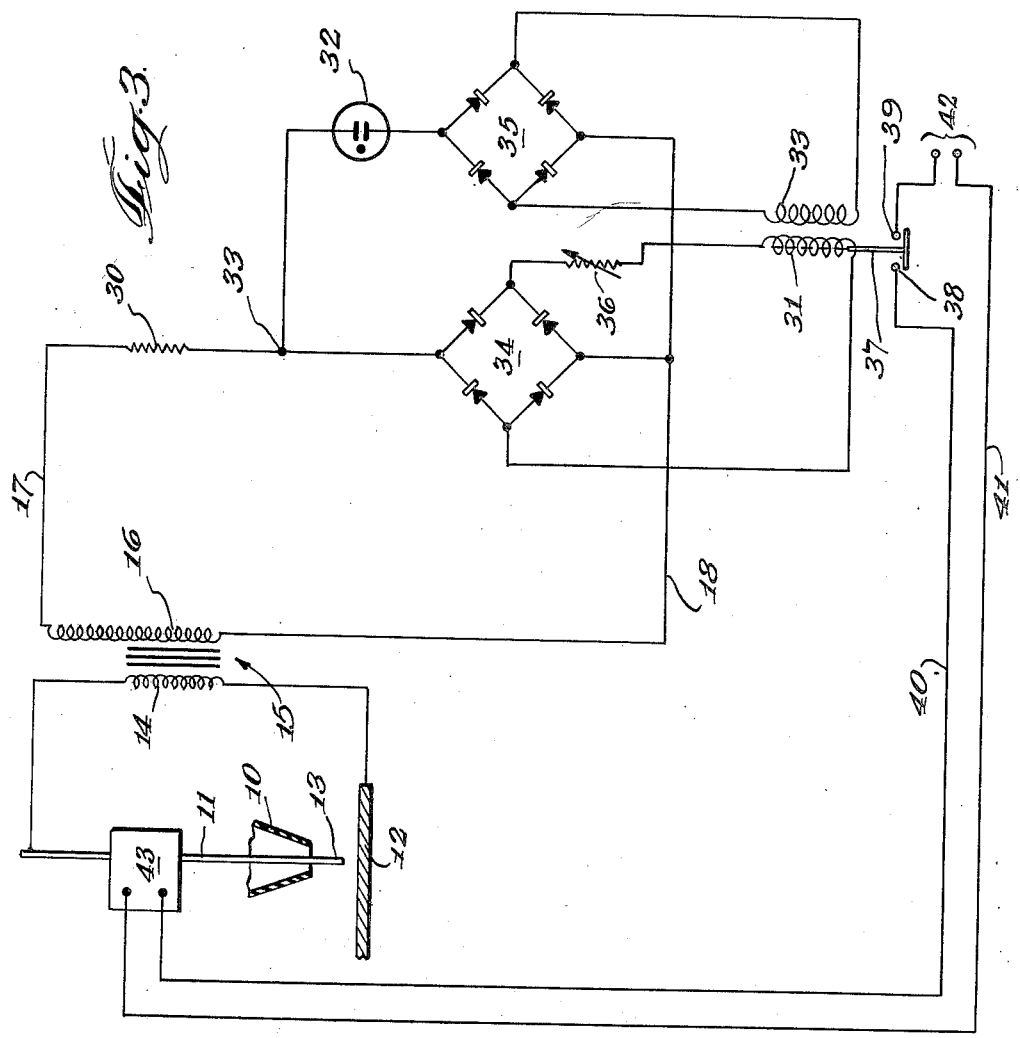
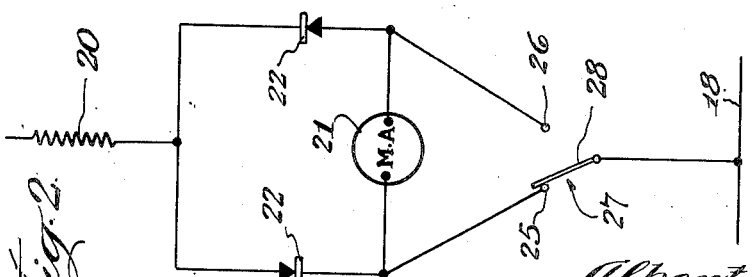
Inventor
Albert E. Feinberg
By J. Irving Silverman
Attorney Patented Jan. 5, 1954

2,665,395

UNITED STATES PATENT OFFICE 2,665,395

MEASURING CIRCUIT

Albert E. Feinberg, Chicago, Ill.

Application November 18, 1950, Serial No. 196,407

1 Claim. (Cl. 315—133)

This invention relates generally to measuring apparatus and more particularly is concerned with apparatus for measuring the voltage across the spark gap of a welding arc, especially a low voltage arc.

In the art of welding by means of an electric arc, it has become a practice in some cases to keep the arc in an atmosphere of some inert gas, such as helium, argon or the like, so that the discharge will be through the gas, and hence of low voltage. The arc exists between a tungsten electrode and a pool of molten metal. The voltage across the space between the electrode and the pool of metal is approximately 30 volts. There will be a slight difference between the voltage in either direction, that is—from electrode to the metal and from the metal to the electrode. Certain information is obtained from a proper measurement of the voltage across the arc, and hence two meters are usually employed—one measuring the voltage in one direction, and a second measuring the voltage in another direction.

The current used in this type of welding is A. C. and hence it is feasible to use two meters, each being a D. C. meter and having oppositely arranged series connected rectifying elements, the meters being connected in parallel with their respective rectifiers.

If, for example, it is desired to be enabled to read very minor changes in the arc voltage, it is necessary that when the arc is at normal operating conditions, the meters be reading close to full scale. The arc voltage is approximately 30 volts under these circumstances, as has been mentioned, but when the arc becomes extinguished, or before it is struck, there exists across the space between the work-piece and the electrode, a voltage of 80 volts. This is almost three times the normal arc voltage. If the meter is reading close to full scale at 30 volts, the sudden change to 80 volts acting upon the ordinary meter will give an off-scale indication, and may well permanently damage the mechanism thereof.

To use a meter which will have such a scale as to be able to indicate this voltage variation would be to defeat most of the reasons for carefully watching arc voltage. The scale would be so coarse as to prohibit fine readings. For example, the rate of electrode consumption could not readily be followed with such a coarse meter.

The action of the voltage across the gap is also detrimental in that it is difficult to provide control devices which operate by virtue of the voltage existing across the gap. Thus, if it is desired to operate some mechanism to keep the electrode spaced a predetermined distance above the work piece, the controlling voltage may either damage the mechanism or cause overrunning when the arc becomes extinguished. In other words, if the voltage across the arc is 26 volts, and the spacing is a given amount, when the tip is consumed the spacing will increase thereby increasing the voltage, say to 27 or 28 volts. This increased voltage is a small increment, and it may be used to operate a control circuit or device which will start an electric motor or mechanical device which in turn will slowly move the electrode closer to the work piece. When the electrode is moved close enough so that the voltage is 26 volts, the control circuit can become inoperative and stop the movement of the electrode. When the arc becomes extinguished however, for any reason, the voltage across the gap becomes equal to the open circuit voltage of the welding arc transformer, which in the case of the example hereinabove referred to may be as high as 80 volts. The control circuit is now subjected to a very high voltage, and if not damaged, it will operate the electrode moving mechanism so long as the voltage remains at the high level. Obviously this can well drive the electrode into the work piece and jam the entire device.

With my invention, this contingency can be taken care of by providing means to render the control circuit inoperative if the voltage across the gap increases beyond a predetermined value.

It is a principal object of the invention to provide a measuring circuit having a device responsive to a predetermined value of voltage across a welding gap, and to provide means which will render such device inoperative in the event that the gap voltage increases beyond a second predetermined value. For the purposes of this specification, it is considered that the control circuit is a measuring circuit having a device as described above.

Another object of the invention is to provide apparatus of the character described which is sensitive to small changes of voltage at a given range, but which is substantially inoperative when the range has been exceeded.

Another object of the invention is to provide apparatus which is very economical and simple and wherein a conventional meter can be used at substantially its maximum point of sensitivity for measuring the voltage across a welding arc without danger of damaging the meter if the voltage across the arc rises to a considerably greater value than normal.

Still a further object of the invention is to provide a measuring circuit of the character described which will enable a simple galvanometer to be used to measure the voltage across a gap the voltage of which is normally one value giving substantially full scale deflection, but which gap is subject to frequent voltage increases of substantially greater value than said normal value.

Another object of the invention is to provide apparatus including a gaseous discharge device which is normally not ignited while the voltage being measured is of a certain normal low value, but which will become ignited when the voltage exceeds a certain high value to cause the increased current resulting therefrom to pass through the discharge device circuit and thereby render the measuring device unresponsive to the increased value.

Still a further object of the invention is to provide apparatus of the character described which will serve to keep the spacing of the electrode above the work piece constant by means of a control circuit operable only when the voltage across the electrode is within a normal range.

Another object of the invention is to provide a device of the character described which will require only one meter for measuring the voltage across the gap in either direction.

Many other objects of the invention will become apparent as a description thereof proceeds in connection with which I have illustrated and described in some detail preferred embodiments. Variations are possible without departing from the spirit of the invention.

In the drawings:

Fig. 2 is a fragmentary schematic electrical diagram of the circuit of my apparatus showing the manner in which same can be modified to require only one meter.

Fig. 3 is a modified form of my apparatus in which means are provided for keeping the electrode at constant height above the work piece.

Figure 1:
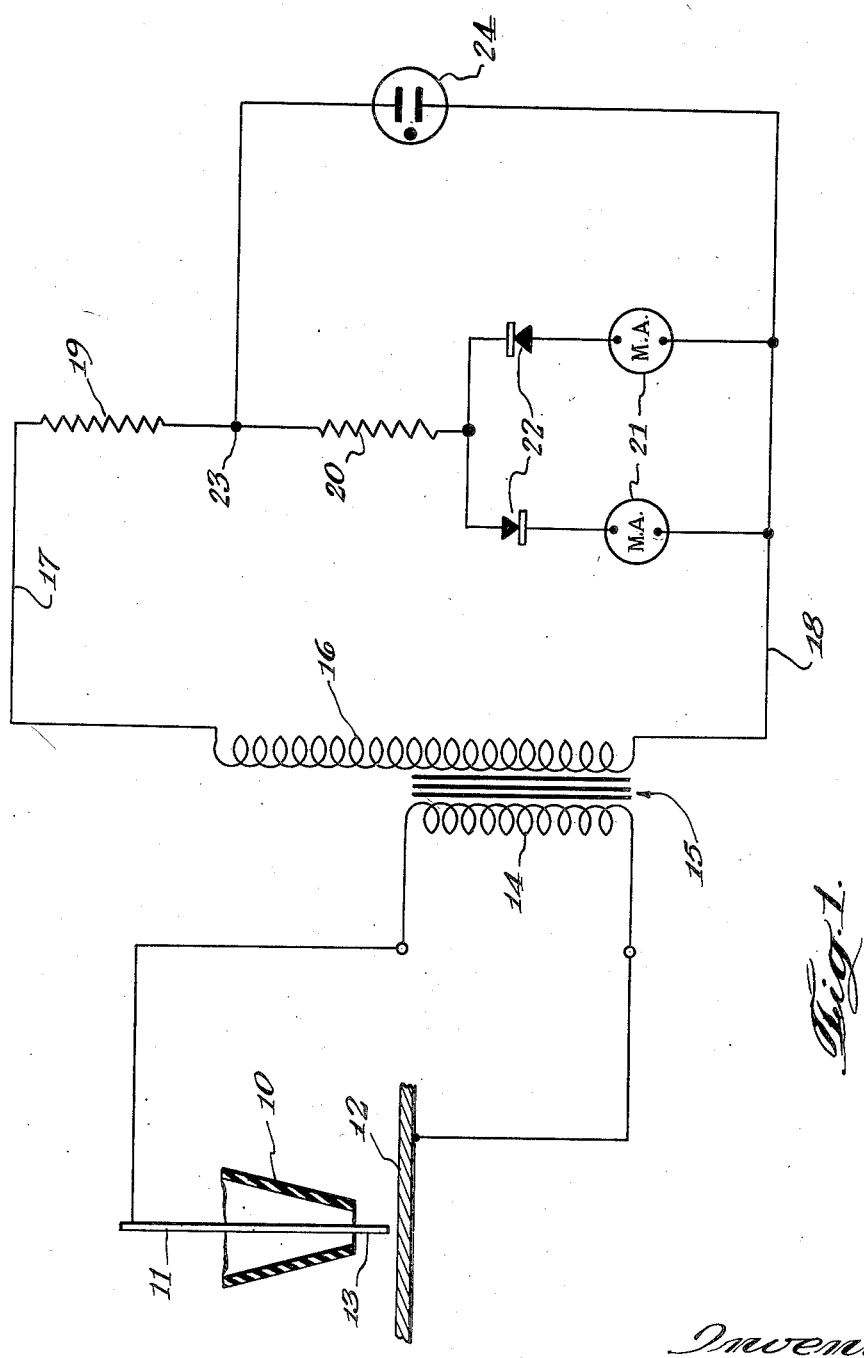
Fig. 1 is a schematic electrical diagram of the circuit of my apparatus, same being shown utilizing two meters.

Referring to the drawings, I have illustrated my apparatus by means of electrical symbols since the exact physical construction of all the parts thereof is well-known. There is illustrated at the left hand end of Fig. 1 a portion of an electrode holding member 10 of insulating material and which leads the inert gas to the arc, and through the center of which passes the tungsten electrode 11. The work piece is designated 12, and the arc referred to herein appears from the tip 13 of the electrode 11 to the work piece 12. The electrode 11 and work piece 12 are connected across the primary 14 of the transformer 15 so that the voltage appearing across the space between the tip and work piece will also be impressed upon the primary 14.

The transformer is a step-up type, and the secondary 16 provides a measuring voltage from lead 17 to lead 18. There is a two-branch voltage divider across leads 17 and 18 which comprises the resistors 19 and 20. Obviously the voltage will divide as the values of the resistors. In the lower branch there are provided a pair of meter circuits in parallel with each other and together in series with the resistor 20. Each meter circuit includes a D. C. galvanometer 21 of conventional construction in series with a rectifier 22. The rectifiers are connected in reverse relationship so that one will indicate average voltage of the positive half cycle and the other will indicate the average voltage of the negative half cycle. These indications will thus signify the voltages in both directions across the gap.

As thus far described, the circuit constants can be chosen so that the normal arc voltage will give a meter deflection at the optimum and most accurate extent thereof. This will be close to full deflection, say—three quarters scale deflection. However, if the voltage of the gap should suddenly rise, no provision has been made for the accommodation of the increased value thereof.

Accordingly I connect a gaseous discharge device across the lower half of the voltage divider, that is to say, in parallel with the resistor and meter circuits combined. This connection extends from the juncture 23 to the lead 18. The gaseous discharge device is indicated by the character 24.

A gaseous discharge device requires a relatively high voltage to ignite. Until it ignites no current will flow therein, but after ignition, the current flow is limited only by external ballast. In the circuit illustrated, the constants are chosen so that at a given maximum voltage the gaseous discharge device 24 will ignite, and thereafter, irrespective of the increase in voltage across the gap between the electrode 11 and the work piece 12, the greater part of the current will by-pass the meter circuits and pass through the gaseous discharge device. In addition, when the voltage returns to normal, the gaseous discharge device will become extinguished and all current will flow through the meter circuits.

In this manner, the meters 21 will read values upon the optimum parts of their scales while the arc is extant, but when the arc becomes extinguished for any reason, the meters will be subject to currents no greater than normal since the major portion of the abnormal current will be by-passing through the gaseous discharge device.

I have built and successfully operated an example of my invention in which the normal voltage was approximately 26 volts and the voltage in an absence of arc was approximately 80 volts. The meters 21 were D. C. milli-ammeters whose full scale deflection was one milliampere (.001 ampere). The transformation ratio of the transformer 15 was 1:2.6. The resistor 19 was chosen at 10,000 ohms, and the resistor 20 was chosen to be 30,000 ohms. The gaseous discharge device was a neon tube, NE-36, whose break-down voltage was about 60 volts. It was determined that at 30 volts the meters were each to indicate approximately three quarters scale, i. e., .00075 ampere. This being average current, the R. M. S. current through the resistor 20 would be about .0165 ampere. Under these conditions the voltage across the neon lamp would be:

$$30 \times 2.6 \times 3/4 = 58.5 \text{ volts}$$

Since the lamp may be chosen to have a breakdown voltage of 60, under these normal operating conditions the lamp would pass no current and the meters would be reading at their best ranges.

Now presume that the voltage across the primary 14 rises substantially. Up to the point where the voltage across the lamp 24 reaches 60 volts, the meters 21 will read a proportionally increased value. Thus, just before breakdown, the current in the meters will be about .00077 ampere. Thereafter, and above the value of voltage at the primary which will ignite the lamp 24, practically no additional current will flow through the meter circuits, because the additional current will be by-passed through the lamp 24. Depending upon the circuit constants and the type of gaseous discharge device used, the current in the meters may even be caused to decrease after ignition of the discharge device so that in the event the voltage across the gap increases manifold, the current in the meters may be able to increase a substantial increment without running off the scale. This may be necessary in a circuit where, because of the characteristics of the discharge device, a small amount of the increased current will find its way into the meter circuit.

It should be appreciated from the above description that I have provided apparatus in which the meters 21 can be under constant surveillance, and the voltages across the gap will both be read simultaneously. I have, however, devised a more economical apparatus which utilizes only one meter, and in which the observer can switch from front to back reading of the arc voltage by means of a simple switch. Thus in Fig. 2 I have shown only the modified part of the circuit of Fig. 1. I provide the same reversed rectifiers 22, but their lower ends are connected through a single meter 21. Each of the rectifier terminals is connected to a contact 25 and 26 respectively, of a simple switch 27, the arm 28 of which is connected to the lead 18.

The operation of this circuit is simple. It contemplates protection for the rectifiers 22, since, to subject a copper oxide rectifier to a back voltage greater than a few volts may damage the same. When the switch arm 27 is engaged with contact 25 the current from say the even half cycles passes through the left hand rectifier from the resistor 20 and to the lead 18 without affecting the meter 21. As for the current from the odd half cycles, it must pass through the meter 21 and the right hand rectifier 22 and hence the meter gives a reading proportional to the voltage in one direction across the gap.

Switching the arm 27 to the contact 26 enables the meter 21 of Fig. 2 to read the voltage across the gap in the opposite direction.

Referring now to Fig. 3, I have shown a measuring apparatus wherein the measurement of the voltage across the arc is done by a control circuit, which in turn operates a device for moving the electrode. Thus, I have shown the same electrode holding member 10, the electrode 11, the work piece 12. The gap exists and the arc will strike between the tip 13 and the work piece 12. The same type of transformer 15 may be provided having the arc voltage impressed on the primary 14 and having the secondary 16 provide the measuring voltage across the leads 17 and 18.

I have again provided a voltage divider in order properly to proportion the voltage being measured between the measuring circuit and that of the gaseous discharge device, but in this embodiment instead of two resistors, there are provided a resistor 30 and a solenoid coil 31. The desired result, however is the same, namely, the voltage divides as the resistance of the two branches of the voltage divider. The gaseous discharge device 32 is connected from the juncture 33 through a solenoid coil 34 to the lead 18. Obviously the resistor 30 will always ballast the discharge device 32 when same is operating.

It will be noted that a full-wave rectifier is provided in the measuring circuit as shown at 34 and in the gaseous discharge circuit as shown at 35. The operation of D. C. solenoids is much more sensitive to current changes and hence it is preferred to convert the A. C. to D. C. by means of these rectifiers. Obviously the device will operate satisfactorily with A. C. in which case the coil 31 will be connected directly between juncture 33 and lead 18, while the coil 35 would be connected directly from the discharge device 32 to the lead 18. If desired, some measure of control can be obtained by means of a variable resistance 36 in series with the solenoid coil 31.

The solenoid coil 31 is intended to move the armature to close the circuit containing the contacts 38 and 39. This circuit which is indicated by the leads 40 and 41 serves to provide electrical power from a suitable power line 42 to an electrode actuating device 43. Any suitable mechanism can be used, such as for example a fractional horsepower electric motor having a gear box and means connecting the same to the electrode mechanically to translate the same in a direction towards the work-piece 12. Any variety of device is within the knowledge of those skilled in the art, and hence the electrode translating mechanism has been shown in diagrammatic form at 43 without detail.

By proper adjustment of circuit constants, the controlled circuit can be arranged to be open while normal voltage exists across the arc. Let us suppose that this is 26 volts. Now, let us further presume that the arc has consumed a small amount of the tip 13 through long use, and the voltage across the arc rises to 28 volts. When this occurs, the coil 31 will exert enough electromagnetic force to attract the plunger of the armature 37 causing the bridging of the contacts 38 and 39 thereby closing the circuit 40 and 41 to the line 42. This will energize the electrode translating mechanism 43, such as for example by starting an electric motor, and same will commence to move the electrode closer to the work-piece 12. As the electrode 11 approaches the work-piece, the voltage across the arc is reduced until, when approximately 26 volts, the current in the coil 31 is insufficient to hold the armature 37 in place, and same will drop open, opening the circuit and de-energizing the electrode translating mechanism 43.

In this manner the electrode 11 can be kept at a constant height above the work-piece notwithstanding the consumption of said electrode.

In the event the arc becomes extinguished for any reason, the voltage across the gap will suddenly rise to about 80 volts. When this occurs, and long prior to reaching the value of 80 volts, the gaseous discharge device will ionize and the greater part of the current will pass through the same. In order to prevent the operation of the electrode translating mechanism when this occurs, as might be occasioned by virtue of even a small increase in the current in the measuring circuit, the current in the gaseous discharge circuit threads the solenoid coil 33. The coil 33 is arranged in opposition to the coil 31, so that the net result is a neutralizing of the magnetic pull thereof. The effect is therefore, that a large increase of voltage across the gap will render the electrode translating device inoperative.

It is believed that the invention has been fully explained such that further details will be unnecessary. It is desired to point out that the symbolic designation of the elements of the circuits are not intended by way of limitation, but are to be interpreted in their broadest aspects, all within the scope of the appended claim.

I claim:

Apparatus for measuring the voltage across an A. C. electric arc appearing in a gap in both directions, the normal voltage across the gap in the absence of an arc being substantially greater than when said arc is extant, which comprises a transformer connected to the gap for raising the voltage thereof, a voltage divider driven by the transformer and having an upper branch and a lower branch, the upper branch comprising an impedance, and the lower branch comprising an impedance in series with a pair of parallel connected galvanometers, each galvanometer having a rectifier in series therewith but in opposite direction whereby the meters read the flow of current through the voltage divider in opposite directions, a gaseous discharge device of predetermined ionization voltage connected across the said lower branch and inoperative when the arc is extant, but serving to ignite and discharge when the arc is extinguished thereby by-passing current which would otherwise flow through said galvanometers, the impedance of the upper branch serving to ballast the said gaseous discharge device when same is discharging.

ALBERT E. FEINBERG.

References Cited in the file of this patent

UNITED STATES PATENTS

| Number | Name | Date |
|---|---|---|
| 1,960,068 | Ruppel | May 22, 1934 |
| 2,073,247 | Miller | Mar. 9, 1937 |
| 2,218,629 | Swart | Oct. 22, 1940 |
| 2,242,951 | Harder | May 20, 1941 |
| 2,243,162 | Lee | May 27, 1941 |
| 2,338,109 | Green | Jan. 4, 1944 |
| 2,340,093 | White | Jan. 25, 1944 |
| 2,451,953 | Ingram | Oct. 19, 1948 |
| 2,469,382 | Gayley | May 10, 1949 |
| 2,505,465 | Deketh | Apr. 25, 1950 |
| 2,514,745 | Dalzell | July 11, 1950 |
| 2,516,756 | Cowley et al. | July 25, 1950 |
| 2,527,336 | Schaefer | Oct. 24, 1950 |
| 2,534,958 | Deming | Dec. 19, 1950 |

FOREIGN PATENTS

| Number | Country | Date |
|---|---|---|
| 542,236 | Germany | Jan. 25, 1932 |